US007013065B2

(12) United States Patent  
Petermann et al.

(10) Patent No.: US 7,013,065 B2
(45) Date of Patent: Mar. 14, 2006

(54) PLANAR OPTICAL APPARATUS FOR SETTING THE CHROMATIC DISPERSION IN AN OPTICAL SYSTEM

(76) Inventors: Klaus Petermann, Im Rehgrund 25, Berlin (DE) 13503; Fabian Florian Kerbstadt, Buschallee 56, Berlin (DE) 13088

( * ) Notice: Subject to any disclaimer, the term of this patent is extended or adjusted under 35 U.S.C. 154(b) by 76 days.

(21) Appl. No.: 10/850,338

(22) Filed: May 19, 2004

(65) Prior Publication Data

US 2005/0089274 A1    Apr. 28, 2005

Related U.S. Application Data

(60) Provisional application No. 60/513,762, filed on Oct. 22, 2003.

(51) Int. Cl.
*G02B 6/34* (2006.01)
(52) U.S. Cl. .......................... 385/37; 385/14
(58) Field of Classification Search ................ 385/14, 385/37
See application file for complete search history.

(56) References Cited

U.S. PATENT DOCUMENTS

| 5,546,483 | A | * | 8/1996 | Inoue et al. ................. 385/14 |
| 5,905,824 | A | * | 5/1999 | Delisle et al. ............... 385/15 |
| 5,940,548 | A | * | 8/1999 | Yamada et al. .............. 385/14 |
| 6,112,000 | A | * | 8/2000 | Bergmann et al. .......... 385/47 |
| 6,115,514 | A | * | 9/2000 | Ando et al. .................. 385/11 |
| 6,304,687 | B1 | * | 10/2001 | Inoue et al. ................. 385/14 |
| 6,456,760 | B1 | * | 9/2002 | Kurokawa et al. .......... 385/31 |
| 6,738,545 | B1 | * | 5/2004 | Purchase et al. ............ 385/37 |
| 6,754,410 | B1 | * | 6/2004 | Doerr et al. ................. 385/16 |
| 6,904,204 | B1 | * | 6/2005 | Hida et al. .................. 385/37 |
| 6,907,160 | B1 | * | 6/2005 | Dragone ...................... 385/24 |

FOREIGN PATENT DOCUMENTS

| WO | WO 96/00915 | 1/1996 |
| WO | WO 99/52003 | 10/1999 |

OTHER PUBLICATIONS

Doerr et al.: "Automatic Colorless Tunable Dispersion Compensator With Integrated Tunable Noise Filter", Post-deadline Session 1: PD1.9, *ECOC, 2002*, 2 pages.

Doerr et al.: "Multichannel Integrated Tunable Dispersion Compensator Employing A Thermooptic Lens", FA6-1, *OFC 2002*, pp. 2-4.

Ooi et al.: "40-Gb/s WDM Transmission With Virtually Imaged Phased Array (VIPA) Variable Dispersion Compensators", Journal of Lightwave Technology, vol. 20, No. 12, IEEE Dec. 2002, pp. 2196-2203.

* cited by examiner

*Primary Examiner*—Ellen E. Kim
(74) *Attorney, Agent, or Firm*—Workman Nydegger (57) ABSTRACT

A planar optical apparatus for setting the chromatic dispersion in an optical system, which apparatus has: a waveguide input structure with a first free-beam region, a first phase grating, connected to the first free-beam region, for spatially separating the spectral components of a signal, a second free-beam region, connected to the first phase grating, an optical element for spatially dependent modification of the phase of the spatially separated spectral components in the second free-beam region, a second phase grating, connected to the second free-beam region, for combining the spectral components, with their phase modified, and a waveguide output structure with a third free-beam region. In this case, the optical element for spatially dependent modification of the phase of the spatially separated spectral components includes a first phase plate that can be displaced in the second free-beam region.

21 Claims, 7 Drawing Sheets

$\Delta n = 2.45$ (Silicon-Air)

PLANAR OPTICAL APPARATUS FOR SETTING THE CHROMATIC DISPERSION IN AN OPTICAL SYSTEM

RELATED APPLICATION

The present application claims priority of U.S. patent application Ser. No. 60/513,762 filed by Klaus Petermann and Fabian Florian Kerbstadt on Oct. 22, 2003.

FIELD OF THE INVENTION

The invention relates in general to a planar optical apparatus for setting the chromatic dispersion in an optical system. It relates, in particular, to a filter component with a settable chromatic dispersion that can be used in optical communication networks for adaptive compensation of chromatic dispersion occurring in such systems.

BACKGROUND OF THE INVENTION

It is known to use so-called arrayed waveguide gratings (AWGs) for multiplexing or demultiplexing optical signals of different wavelength. An AWG generally comprises two free-beam regions that are interconnected by a phase-shifting arrangement. Following the free-beam regions are waveguides for coupling light in and out. A corresponding arrangement is described, for example, in WOA96/00915 and WOA99/52003.

The post deadline papers entitled "Automatic Colorless Tunable Dispersion Compensator with Integrated Tunable Noise Filter" by C. R. Doerr et al., PD1.9, ECOC 2002 and "Multichannel Integrated Tunable Dispersion Compensator Employing a Thermo-optic Lens" by C. R. Doerr et al., FA6-1, OFC 2002, describe a structure that comprises two cascaded arrayed waveguide gratings. The symmetrical structure comprises two integrated optical phase gratings of very high order. The first phase grating separates the wavelengths of the spectrum of an optical data signal spatially. With the aid of a settable lens, it is possible to undertake phase control which is a function of location and/or wavelength and effects control of the dispersion. The second phase grating recombines the individual spectral, and now phase-shifted components and directs the optical signal to the output waveguide.

The known solution is designed in an integrated optical fashion using the technology of $SiO_2$ on Si. The settable lens is implemented by means of the thermo-optic effect in glass. Applied for this purpose to the wafer with the optical structure, at the site at which the lens is to be located are metal heating strips that heat up when flowed through by current and thereby change the refractive index of the glass at this site.

A disadvantage of the known structure resides in that setting a specific dispersion value always requires the application of a certain electric power in order to control the lens. Since the thermo-optic effect in glass is relatively small ($dn/dT \approx 1 \cdot 10^{-5}$ 1/° K.), the required temperatures, and thus also the electric power are relatively high. Again, the heating operation per se is disadvantageous, since mechanical stresses are produced in this case in the material and have a disadvantageous effect on the reliability of the structure. A further disadvantage consists in that the known structure is designed for use in 40 Gb/s systems. In the case of application to more powerful systems, for example 160 Gb/s systems, the required phase differences that have to be provided by the lens become so large that they can no longer be implemented in a practical way in glass.

The publication "40-Gb/s WDM Transmission with Virtually Imaged Phased Array (VIPA) Variable Dispersion Compensators", Hiroki Ooi et al., Journal of Lightwave Technology, vol. 20, No. 12, December 2002 discloses a component in the case of which the spectral components of the optical signal are likewise spatially separated by a virtual phase grating. This separation is performed in such a way that the spectral components of the signal are imaged in the image plane of the structure on a straight line. A mirror with a curved surface is brought into this image plane. This curvature has the effect that a phase shift which is quadratic over the location and/or wavelength is impressed during reflection on the spatially resolved or wavelength-resolved optical signal. The phase shift which is quadratic over the wavelength effects a dispersion of the signal when it leaves the component. The three-dimensionally curved surface of the mirror also has the effect that the curvature of the phase shift which is quadratic over the wavelength, and thus the dispersion of the component change when the mirror is displaced. The dispersion of the component is therefore a function of the position of the mirror.

It is disadvantageous that this known solution is not implemented in an optically integrated fashion. It requires a relatively complicated design with a multiplicity of individual parts. In particular, the mirror with the three-dimensional curved surface constitutes an element that is difficult to produce Furthermore, a special stepping motor developed in a dedicated fashion is disadvantageously required.

SUMMARY OF THE INVENTION

The present invention is directed to a planar optical apparatus for setting the chromatic dispersion in an optical system without supplying energy for heating purposes, and which has a simple design.

According to an embodiment of the invention, a planar optical apparatus includes:
 a waveguide input structure with a first free-beam region,
 a first phase grating, connected to the first free-beam region, for spatially separating the spectral components of a signal,
 a second free-beam region, connected to the first phase grating,
 means for spatially dependent modification of the phase of the spatially separated spectral components in the second free-beam region,
 a second phase grating, connected to the second free-beam region, for combining the spectral components, with their phase modified, and
 a waveguide output structure with a third free-beam region,
 wherein the means for spatially dependent modification of the phase of the spatially separated spectral components comprises a first phase plate that can be displaced (moved) in the second free-beam region.

The solution according to the invention is therefore distinguished by the idea that the means for spatially dependent modification of the phase of the spatially separated spectral components of a signal are provided by a phase plate that is arranged displaceably in the free-beam region between the two phase gratings. The dispersion can be changed and/or set by a displacement of the phase plate. Thus, a spatially dependent change in the phase of the spatially separated spectral components of a signal specifically leads to a change in the dispersion. In particular, it is possible to compensate an existing chromatic dispersion of an input signal by positioning the phase plate suitably.

The solution according to the invention is of simple design, since a planar optical implementation is possible on a planar carrier substrate. Complicated structures or the addition of external heating energy are not required.

It may be pointed that within the meaning of the present invention a phase plate is understood as a structure that applies a phase change in a spatially dependent fashion to light passing through the phase plate. It is provided in particular for this purpose that the thickness of the phase plate is varied in a spatially dependent fashion, light passing through the phase plate experiencing a different phase change in accordance with the thickness of the trans-irradiated material. However, a spatially dependent phase change can also be provided, for example, by means of a variation in the refractive index of the material of the phase plate.

A spatially dependent change in the phase is obtained if the change in the phase is effected on spectral components of a signal that are spatially separated on the basis of the first phase grating.

In a preferred refinement of the apparatus according to the invention, the first phase plate is arranged such that it can be longitudinally displaced perpendicular to the signal propagation direction in the second free-beam region. The phase plate is located in this case in a region of the second free-beam region in which the light emerging from the first phase grating interferes constructively and forms a real image of the field distribution of the fundamental mode of the input signal. As a rule, this is the central plane of the second free-beam region, that is to say the region that is equally as far removed from the first as from the second phase grating. However, the phase plate can be arranged inside a certain central region, since the spectral components of the light are already spatially separated upstream and downstream of the exact central plane.

The phase plate is preferably arranged in a groove in a planar substrate on which the second free-beam region is implemented. The setting of the dispersion is performed by displacing the phase plate in the groove.

The first phase plate preferably effects a spatially dependent change in the phase of the spatially separated components of a signal in such a way that the phase change has a cubic characteristic depending on location. In other words, the phase signature, that is to say the phase change over the location, has a cubic characteristic. Thus, the phase signature of the first phase plate is defined by a polynomial of the third degree. The coefficients can be determined in this case in a unique way from the boundary conditions of the apparatus.

In an advantageous refinement of the invention, means are provided for defined displacement of the first phase plate. These means are, for example, a piezoelement or micro-positioning motors that displace the phase plate along the groove.

The use of a longitudinally displaceable phase plate permits the setting of the dispersion of a planar optical apparatus within a certain range. However, a so-called dispersion slope is also always present, that is to say the dispersion set is not constant over the wavelength. For systems with low bit rates, this fact can be negligible, whereas this is not so for systems with high bit rates.

In a preferred development of the present invention, which is suitable, in particular, for systems with high bit rates, there is therefore provided in the region of the second free-beam region an additional, spatially fixed phase modification device that effects a spatially dependent shifting of the phase of the spatially separated spectral components of a signal in such a way as to compensate a wavelength dependency of the dispersion set by means of the first phase plate. This additional phase modification device is preferably located, just like the first phase plate, in the middle plane of the second free-beam region.

The phases of the spectral components, spatially separated in the central plane of the structure, of the optical signal are shifted in a spatially dependent fashion by the additional phase modification device in the same way as by the first phase plate. However, the phase modification device is constructed in a spatially fixed fashion in the second free-beam region, that is to say by contrast with the first, displaceable phase plate, there is no possibility of variation. The spatially dependent phase shift is fixed once and for all in the production process of the additional phase modification device.

Owing to the further spatially fixed phase modification device, it is possible for the unavoidable wavelength dependence of the set dispersion to be compensated for all the positions of the displaceable phase plate or for all settable dispersion values. The overall structure therefore has no wavelength dependence of the dispersion.

In a second refinement, the additional phase modification device has a phase signature such that the intrinsic dispersion of the planar optical apparatus under consideration is compensated instead of a wavelength dependence of the set dispersion. In a particularly preferred third refinement, it is provided that the phase signature of the additional phase modification device is selected in such a way that both the intrinsic dispersion of the apparatus and the dispersion slope already discussed are compensated. In this case, the intrinsic dispersion is that dispersion that would result if no phase plate or no phase shift were introduced into the free-beam region between the two phase gratings.

If, as is preferable, the spatially fixed phase modification device is used to compensate both the wavelength dependence of the set dispersion (dispersion slope) and the intrinsic dispersion, all that remains in this case for the displaceable first phase plate is the task of varying the dispersion about the zero point. Thus, the dispersion of an optical system can be set, or an existing dispersion can be compensated in a particularly effective way.

The additional phase modification device preferably effects a spatially dependent shift in the phases of the spatially separated spectral components of a signal in such a way that the phase change has a cubic characteristic depending on location. The phase signature of the additional phase modification device therefore preferably has a cubic characteristic, that is to say it is described by a polynomial of third degree, it being possible to uniquely determine the coefficients of the polynomial by the boundary conditions of the system.

The additional phase modification device can be implemented in various ways. In a preferred refinement, this is done by means of a second phase plate that is arranged nondisplaceably in the second free-beam region. In an alternative refinement, the additional phase modification device is provided, however, by a permanent variation in refractive index inscribed by means of UV radiation in an area under observation. Such methods are known from the production of fiber Bragg gratings.

When the phase modification device is intended to compensate the dispersion slope and the intrinsic dispersion of the component, the required phase shift will be higher than when only the dispersion slope, but not the intrinsic dispersion, is to be compensated. If the additional phase modification device is implemented as a fixed second phase plate in a groove, a smaller phase shift will result advantageously in a smaller thickness of the phase plate, and thus in smaller losses. The intrinsic dispersion, then not compensated, of the component can in this case be compensated at another point in the optical transmission channel.

In a preferred refinement, the planar optical apparatus under consideration is of symmetrical design, the first phase plate being located in a central zone of the second free-beam region between the first and the second phase gratings. Also located in this central zone is the additional phase modification device preferably provided.

In a further refinement of the present invention, the waveguide input structure is the same as the waveguide output structure, the first free-beam region is the same as the third free-beam region, and the first phase grating is the same as the second phase grating. In this case, the second free-beam region includes a reflection device at which the optical signal is reflected. The reflection device is, for example, a mirror constructed in the second free-beam region.

In this variant of the invention, the planar optical apparatus is therefore operated not in transmission but in reflection. The optical signal is reflected in the second free-beam region. Of course, just as previously described, in this case a phase setting or phase control is performed by the first phase plate and, accordingly, an additional phase modification device. The modified spectral components of the signal are recombined by the same phase grating that has previously effected spatial separation of the spectral components. Consequently, the waveguide input structure is also the same as the waveguide output structure. In a preferred refinement, the waveguide input or output structure is connected in this case to a 3-gate circulator.

It may be pointed out that this variant of the invention can be designed in a particularly space-saving fashion, since half the components are saved and only half the area is therefore required.

The planar optical structure according to the invention is preferably implemented on the material basis of $SiO_2$ on Si. The first phase plate preferably consists of a highly refractive material so that it is possible to achieve high phase shifts despite a low thickness of the phase plate. For this purpose, the phase plate consists of silicon, for example. The same holds for any possibly present second phase plate for compensating the wavelength dependence of the dispersion and/or for compensating an intrinsic dispersion of the apparatus.

Moreover, it is advantageously provided that the first phase plate or any possibly present second phase plate are provided with an antireflection coating. Undesired Fresnel losses are thereby reduced.

DESCRIPTION OF A PREFERRED EXEMPLARY EMBODIMENT

Figure 1:
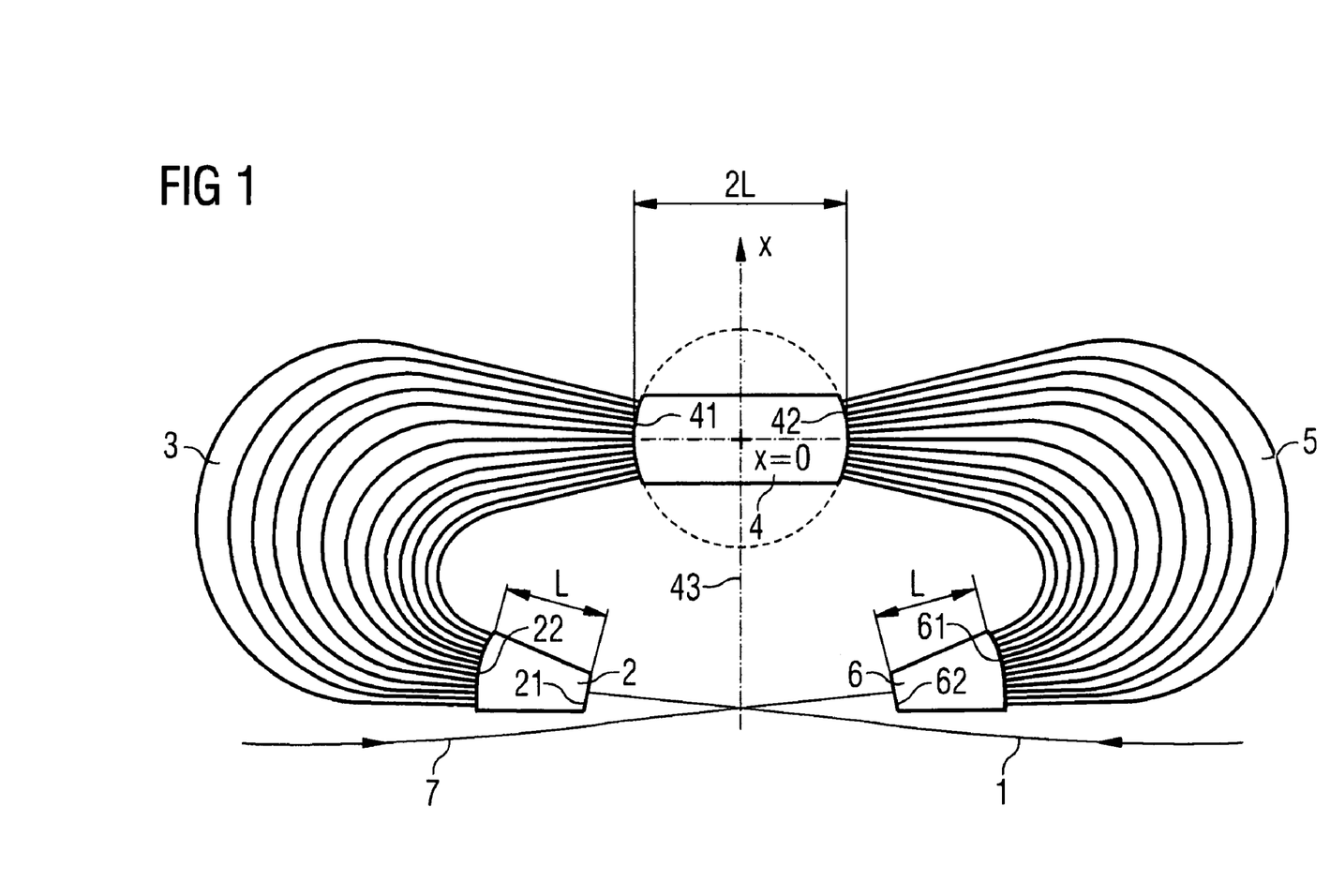
FIG. 1 shows a schematic illustration of a planar optical apparatus for setting the chromatic dispersion and having a first phase grating, a second phase grating and a free-beam region arranged therebetween.

FIG. 1 shows the fundamental design of a planar optical apparatus for compensating chromatic dispersion. The apparatus has an input waveguide 1, a first free-beam region 2 with an input 21 and an output 22, a first phase grating 3, a second free-beam region 4 with an input 41 and an output 42, a second phase grating 5, a third free-beam region 6 with an input 61 and an output 62, and an output waveguide 7. The individual components are constructed in an integrated optical fashion on a planar carrier substrate, for example using the technology of $SiO_2$ on Si.

The input waveguide 1 is connected to the input 21 of the first free-beam region 2. An expansion of the free space takes place in the first free-beam region 2, that is to say the light beam coupled in diverges and illuminates the waveguides of the phase grating (phased arrays) 3, which follows the output 22 of the first free-beam region 2. The phase grating 3 has a plurality of strip-type optical waveguides, which run in a curved fashion and have a varying optical length from waveguide to waveguide, the length difference between two neighboring waveguides being constant.

The light is coupled from the first free-beam region 2 into the waveguides of the phase grating 3, and propagates through these up to the second free-beam region 4, to whose input 41 the waveguides of the phase grating 3 are connected. The light interferes constructively in the region of a central plane 43 of the second free-beam region 4, a real image of the field distribution of the fundamental mode of the input waveguide 1 being produced there.

In accordance with the mode of operation of such phase gratings, a spatial splitting of the spectral components of the input signal takes place in this case in the central plane 43 of the second free-beam region 4. In this process, the central wavelength $\lambda_c$ of the optical signal is projected onto the location x=0 of the central plane 43, x specifying the direction perpendicular to the direction of propagation of the light. A location x>0 results for shorter wavelengths, and a location x<0 for longer wavelengths. The signal with the spectral width $\Delta F$ is projected onto the spatial interval $\Delta X_{signal}$ in the central plane 43 of the second free-beam region 4.

Since they are spatially split, the individual spectral components of the input signal can be set and/or controlled in phase depending on location in the central plane 43 of the second free-beam region 4. The spatially dependent setting of the phase is performed via phase plates as will be explained with the aid of FIGS. 2A, 2B.

The light, modified in phase, of the spectral components is coupled into the second phase grating 5 at the output 42 of the second free-beam region 4, the spectral components modified in phase being recombined. The second phase grating 5 is connected to the input 61 of the third free-beam region 6, in which free space propagation takes place, in turn, the light interfering constructively and being fed to the output waveguide 7 connected to the output 62 of the third free-beam region.

It may be pointed out that the first and the third free-beam regions 2, 6 have a length L, while the second free-beam region 4 has double the length 2L, as may be seen from FIG. 1.

Figure 2A:
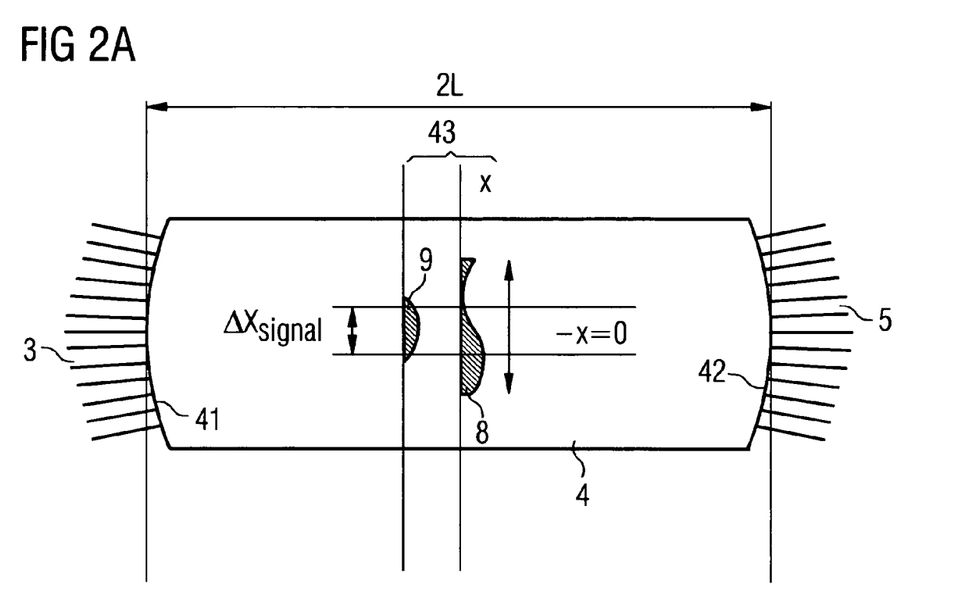
FIG. 2A shows an illustration of a detail of the apparatus of FIG. 1 that shows in plan view the free-beam region arranged between the phase gratings.
Figure 2B:
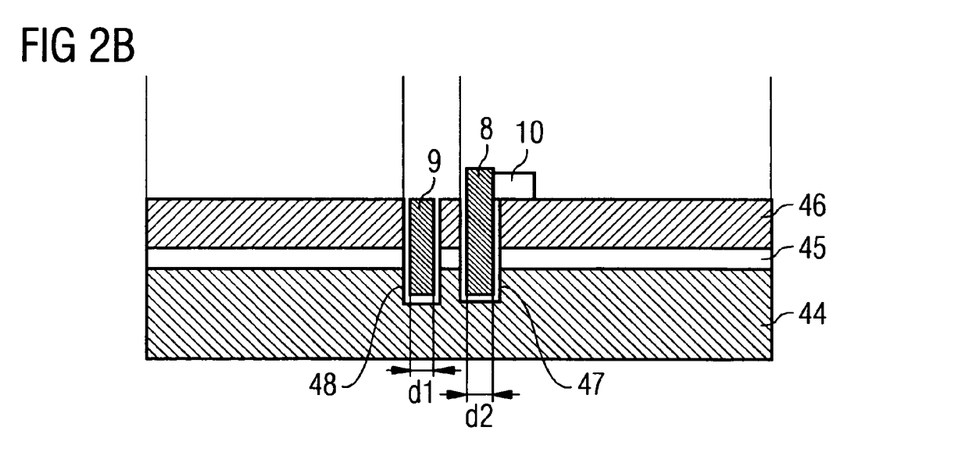
FIG. 2B shows a side view of the free-beam region of FIG. 2A.

FIGS. 2A, 2B show the second free-beam region 4 in plan view and in side view. Arranged in the region of the central plane 43 is a first phase plate 8 that can be displaced longitudinally perpendicular to the direction of propagation of the light in the second free-beam region 4. For this purpose, the phase plate 8 in accordance with FIG. 2b is arranged in a groove 47 in the carrier substrate of the free-beam region 4. In this case, the design of the free-beam region is, in a way known per se, such that a light-guiding core layer 45 is located on a substrate 44 and a cover layer 46. All layers consist of $SiO_2$. The core layer has the largest refractive index. The core layer and the cover layer are preferably formed by $SiO_2$ layers, the core layer having the larger refractive index.

In order to achieve a longitudinal displacement of the first phase plate 8 in the second free-beam region 4, an actuating device 10 (illustrated schematically) is provided that is connected to the phase plate 8, compare FIG. 2B. For reasons of clarity, the actuating device 10 is not illustrated in FIG. 2A. The actuating device 10 is, for example, a piezoactuator or a micro-stepping motor that is arranged, for example, on the surface of the second free-beam region 4.

Furthermore, there is likewise arranged in the region of the central plane 43 a second phase plate 9 that likewise effects a specially dependent change in the individual spectral components of the input signal. The second phase plate 9 is likewise located in a groove 48 in the second free-beam region 4. The two phase plates 8, 9 have a maximum thickness d2, d1 that varies as a function of location x, as a result of which the phase change of the individual spectral components of the signal is different as a function of the location x.

In accordance with FIGS. 2A, 2B, the input signal is firstly phase-shifted-in a spatially dependent fashion by the fixed phase plate 9, and subsequently phase-shifted by the displaceable phase plate 8. Depending on the position of the displaceable phase plate 8, the signal is provided with another phase signature, and another dispersion is set in this way. After this phase control, the spectral components of the signal from the second phase grating 5 and the third free-beam region 6 are recombined and fed to the output waveguide 7.

The grooves 47, 48 constructed in the planar substrate 44, 45, 46 have a depth such that the phase plates 8, 9 can become effective at the level of the core layer in which the light is guided. The displaceable phase plate 8 projects a little in this case over the wafer surface such that the actuating device 10 can be fastened thereon.

The grooves 47, 48 are produced, for example, by deep etching of the integrated optical structure 44, 45, 46 after the production thereof.

It is to be seen from the side view of FIG. 2B that the lateral wave guidance is lost inside the grooves 47, 48 for the phase plates 8, 9. This gives rise to losses, which amount to a maximum of 0.3 dB per phase plate 8, 9. It can be provided for reducing the losses that an index-matched material is filled into the grooves 47, 48 and stretches between the edge of the grooves 47, 48 and the respective phase plate 8, 9.

The fixed phase plate 9 serves the purpose of compensating a dispersion slope and/or the compensation of an intrinsic dispersion of the apparatus. Both effects are preferably compensated. A compensation of the dispersion slope is consequently sensible because the displaceable phase plate 8 can set the dispersion correctly only for the central wavelength. However, an observed channel has a spectral width. The dispersion has a wavelength dependence that is linear for the wavelengths outside the central wavelength.

To compensate the intrinsic dispersion, the fixed phase plate 9 provides a spatially dependent shift in phase that corresponds to the intrinsic phase shift of the apparatus, but has an opposite sign.

There now follows a mathematical derivation of the calculation of the phase signature of the displaceable and fixed phase plates 8, 9.

Specific boundary conditions of the apparatus are to be presumed as known in this case. The following are known: the effective refractive index n of the waveguides of the phase gratings 3, 5; the center spacing $d_w$ of the waveguides of the phase gratings 3, 5 at the input to the free-beam region; the speed of light in vacuum $c_0$; the central wavelength $\lambda_c$; and the length L, which equals the radius of the free-beam regions 2, 6.

The length interval in which the phase plate 8 can be displaced also needs to be defined. The phase plate 8 can be displaced in this case from a zero position by the length $v_0$ in the (−x) direction or in the (+x) direction. The position v of the displaced phase plate can thus assume values in the range from $(-v_0)$ to $(+v_0)$.

Also to be defined is the interval in which it is to be possible to set the dispersion of the components. The dispersion can be set in the range from $(-D_0)$ to $(+D_0)$.

The dispersion is intended in this case to change linearly with the manipulated variable—the position x of the displaceable phase plate.

The setting of the dispersion is also accompanied by a change in the group delay τ of the central wavelength. The characteristic of the group delay of the central wavelength is to have a quadratic characteristic when plotted against the manipulated variable—the position x of the displaced phase plate.

The following table of values is therefore to hold:

| Position v | $-v_0$ | 0 | $+v_0$ |
| --- | --- | --- | --- |
| Dispersion D | $-D_0$ | 0 | $+D_0$ |
| Group delay $\tau_{GR}$ | $+\tau_0$ | $-\tau_0$ | $+\tau_0$ |

The variable $\tau_0$ in this case describes the characteristic of the group delay of the central wavelength. However, $\tau_0$ is not the absolute group delay through the apparatus, but only a deviation from a certain offset. The group delay of the central wavelength through the apparatus therefore has a certain value T. Thus, when the phase plates 8, 9 are introduced and the dispersion is controlled, the group delay of the central wavelength then deviates, depending on the position of the moveable phase plate 8, by the value of T shown in the table.

The electric field strength is described in equation (1) as a function of $\Delta\lambda = \lambda - \lambda_c$ and position x on the central plane 43 of the second free-beam region. The equation (1) is derived with the aid of a few admissible assumptions and the application of Fourier optics.

$$E(x, \Delta\lambda) = A \cdot \exp\left(\frac{-j \cdot \pi \cdot n}{\lambda_C \cdot L} \cdot x^2\right) \cdot \exp\left(-\left(\frac{x}{wg} + \frac{m \cdot L \cdot \Delta\lambda}{wg \cdot n \cdot dw}\right)^2\right) \quad (1)$$

Here "wg" is the 1/e-width (or mode field radius) of the input waveguide mode, which is images on the middle focal plane of the second free-beam region.

Here, A is a constant amplitude value that depends on the excitation. The second exponential expression in the equation (1) describes how the position of the light spot on the x axis changes with wavelength. A Gaussian field distribution obtains, in which the location of the maximum depends on $\Delta\lambda$. The change in the position of the light spot on the x axis with wavelength can also be expressed by equation (2):

$$\frac{\partial x}{\partial \lambda} = \frac{-m \cdot L}{n \cdot dw} \quad (2)$$

The first exponential expression in equation (1) describes a phase shift of the light on the central plane of the second free-beam region 4. There is a quadratic phase characteristic plotted against position. Since the wavelengths are spatially split, this is equivalent to a quadratic phase shift when plotted against wavelength. This quadratic phase shift when plotted against wavelength is the cause of the abovementioned intrinsic dispersion of the component.

The phase shift in accordance with equation (1) must be considered with a factor 2 when calculating the phase signatures of the phase plates 8, 9. Use is made below of equation (3), which describes this intrinsic phase shift owing to the second free-beam region 4;

$$\varphi_{FPR}(x) = \frac{-2\pi \cdot n}{\lambda_C \cdot L} \cdot x^2 \quad (3)$$

"FPR" stands in this case for "free propagation region".

A polynomial of $3^{rd}$ degree is applied in order to calculate the phase signatures of the two phase plates 8, 9:

$$\phi_{fix}(x) = a_3 \cdot x^3 + a_2 \cdot x^2 + a_1 \cdot x \quad (4)$$

$$\phi_{reloc}(x,v) = b_3 \cdot (x-v)^3 + b_2 \cdot (x-v)^2 \quad (5)$$

"reloc." stands for displaceable (relocatable) in this case.

Equation (4) is the formation for the phase signature of the fixed phase plate 9. Equation (5) is the formation for the phase signature of the moveable phase plate 8. The phase shift plotted against the position x on the central plane of the second free-beam region 4 is dependent on the position of the lens in the case of the moveable phase plate. Consequently, the phase shift depends on x and v in equation (5). The result is thus a phase shift $\phi_{total}$ which is finally to be taken into account in accordance with equation (6):

$$\phi_{total}(x,v) = \phi_{FPR}(x) + \phi_{fix}(x) + \phi_{reloc}(x,v) \quad (6)$$

The following equations hold for the group delay $\tau_{GR}$, the dispersion D and the dispersion slope S:

$$\tau_{GR} = -\frac{\partial \varphi}{\partial \omega} = \frac{\lambda_C^2}{2\pi c_0} \cdot \frac{\partial \varphi}{\partial \lambda} \quad (7)$$

$$D = \frac{\partial \tau_{GR}}{\partial \lambda} \quad (8)$$

$$S = \frac{\partial D}{\partial \lambda} \quad (9)$$

Substituting the total phase shift $\phi_{total}$ from equation (6) in equation (7) for the phase shift $\phi$ and, furthermore, applying equation (2) yields, $$\tau_{GR} = \left(\frac{-m \cdot L}{n \cdot dw}\right) \cdot \left(\frac{\lambda_C^2}{2\pi c_0}\right) \cdot \left(\frac{\partial \varphi_{total}}{\partial x}\right) \quad (10)$$

Substituting equation (10) in equation (8) and (9) and applying equation (2) in turn yields:

$$D = \left(\frac{-m \cdot L}{n \cdot dw}\right)^2 \cdot \left(\frac{\lambda_C^2}{2\pi c_0}\right) \cdot \left(\frac{\partial^2 \varphi_{total}}{\partial x^2}\right) \quad (11)$$

$$S = \left(\frac{-m \cdot L}{n \cdot dw}\right)^3 \cdot \left(\frac{\lambda_C^2}{2\pi c_0}\right) \cdot \left(\frac{\partial^3 \varphi_{total}}{\partial x^3}\right) \quad (12)$$

Equation (6) can now be substituted in equations (10) to (12) and the following system of equations can be set up:

$$\tau_{GR}(x=0, v=0) = -\tau_0 \quad \text{I.}$$

$$\tau_{GR}(x=0, v=v_0) = \tau_0 \quad \text{II.}$$

$$D(x=0, v=v_0) = D_0 \quad \text{III.}$$

$$D(x=0, v=-v_0) = -D_0 \quad \text{IV.}$$

$$S(x=0, v=0) = 0^{10} \quad \text{V.}$$

It may be seen that the requirements of the system of equations have been taken from the above table except for equation V. The requirement V. for a dispersion slope of zero at x=0 and v=0 has been added to the requirements from the table. It would not be possible to obtain numerous certain equations for 5 unknowns with the aid of all the requirements from the table, nor to be able to find a solution. Consequently, two requirements have not been taken over from the table, the result being the above requirements I to V. This system of equations with 5 equations and 5 unknowns can be solved. Analytical expressions are obtained for the unknowns a1, a2, a3, b3 and b2:

$$a_1 = \frac{2 \cdot \tau_O \cdot n \cdot dw \cdot \pi \cdot c_0}{m \cdot L \cdot \lambda_C^2} \quad (13)$$

$$a_2 = \frac{n \cdot \pi \cdot (-4 \cdot m \cdot L \cdot \tau_O \cdot dw \cdot c_0 + D_O \cdot n \cdot dw^2 \cdot c_0 \cdot v_O + 4 \cdot m^2 \cdot L \cdot \lambda_C \cdot v_O)}{2 \cdot m^2 \cdot L^2 \cdot \lambda_C^2 \cdot v_O} \quad (14)$$

-continued $$a_3 = \frac{D_O \cdot n^2 \cdot dw^2 \cdot \pi \cdot c_0}{3 \cdot m^2 \cdot L^2 \cdot \lambda_C^2 \cdot v_O} \quad (15)$$

It can now be established that when plotted against position v of the displaceable phase plate 8 the group delay of the central wavelength has a parabolic characteristic that corresponds to the requirements I. and II. However, the vertex of the parabola is not at v=0, as would be the case for complete fulfillment of the requirements from the table. However, this state can further be enforced by further satisfying the following equation:

$$L = \frac{D_O \cdot n \cdot dw \cdot v_O}{4 \cdot m \cdot \tau_O} \quad (18)$$

Satisfying Eqn. 18 leads to $b_2$=0.

The phase signatures of the two phase plates 8, 9 which are a polynomial of third degree, are completely described by equations (13) to (18). The satisfaction of equation (18) minimizes the losses and ensures a symmetrical characteristic of the transmission curve for the case v=0.

It may be pointed out that despite the equations to be satisfied there are still degrees of freedom in designing the apparatus that will not be gone into further.

Particular parameter values, which can be implemented by way of example will now be specified for the exemplary embodiment of FIGS. 1, 2A, 2B:

The apparatus is designed by way of example for use in 160 Gb/s systems. The central wavelength is $\lambda_c$=1.55 µm. The free spectral region is $\Delta f_{FSR}$=400 GHz. The group delay difference between neighboring waveguides of the phase grating 3, 5 is therefore $\Delta \tau_{GR}$=2.5 ps. The passband is to have a width of $\Delta f_{signal}$=240 GHZ. The desired control range of the dispersion is to be $D_{TOP}$=±100 ps/nm. No dispersion slope is to be present. The fixed phase plate 9, which in this case compensates the intrinsic dispersion and the dispersion slope, must be present for this purpose.

The length L of the free-beam regions is L=13 249 µm for this example. The phase gratings 3, 5 comprise M=209 waveguides. The variable $\Delta X_{signal}$ is $\Delta X_{signal}$=680 µm. This is also the required length of the fixed phase plate 9. The displaceable phase plate 8 has a length, greater by comparison therewith, of 1 280 µm. The displacement path $v_0$ of the displaceable phase plate 8 is ±$v_0$=300 µm. The phase plate 8 can therefore be displaced from its zero position by 300 µm in both directions.

The relationship between the position of the displaceable phase plate 8 and the dispersion is to be linear, that is to say the dispersion is zero, when the phase plate is located in its zero position, from which it can be displaced upward or downward by $v_0$=300 µm. When the phase plate is displaced upward by $v_0$=300 µm, the dispersion +$D_{TOP}$=+100 ps/nm. The dispersion –$D_{TOP}$=–100 ps/nm in a corresponding fashion when the phase plate 8 is displaced downward by $v_0$=300 µm. The required displacement path of $v_0$=600 µm can be achieved with the aid of conventional piezoelements.

Figure 5A:
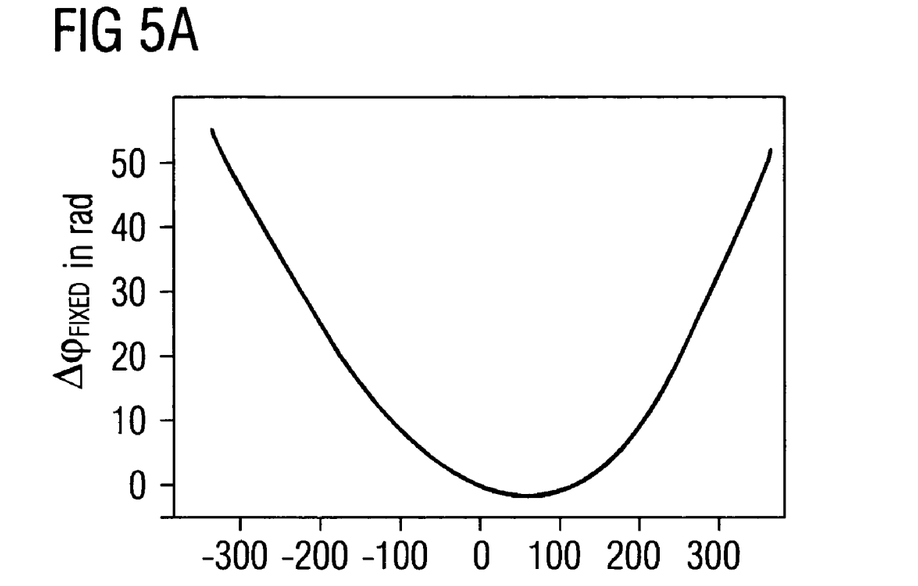
FIG. 5A shows the phase change caused by the fixed phase plate of FIGS. 2A and 2B, as a function of location.
Figure 5B:
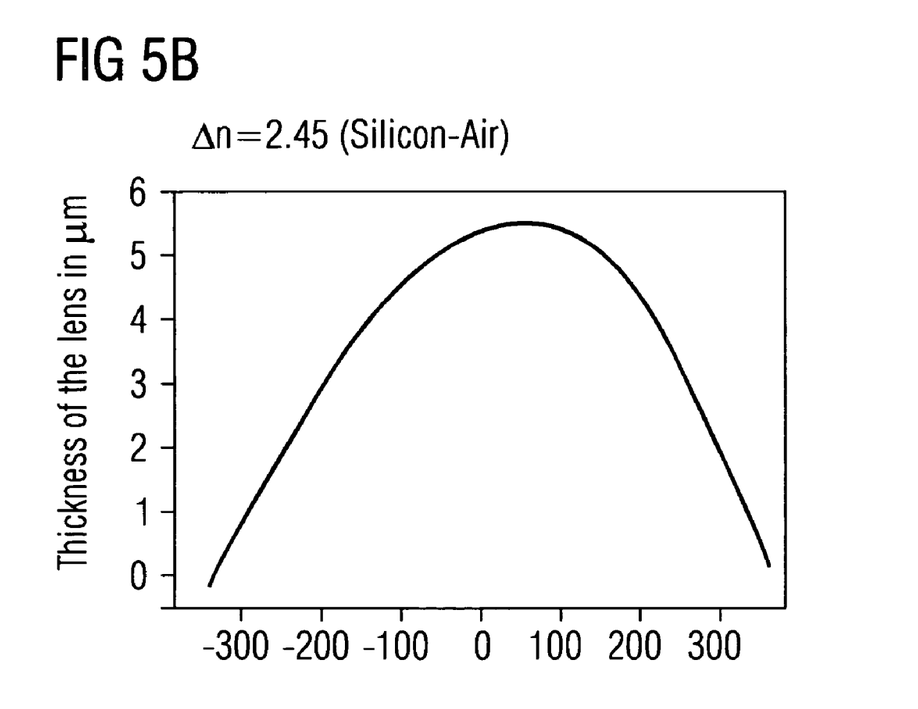
FIG. 5B shows the thickness of the fixed phase plate of FIGS. 2A and 2B, as a function of location.
Figure 5C:
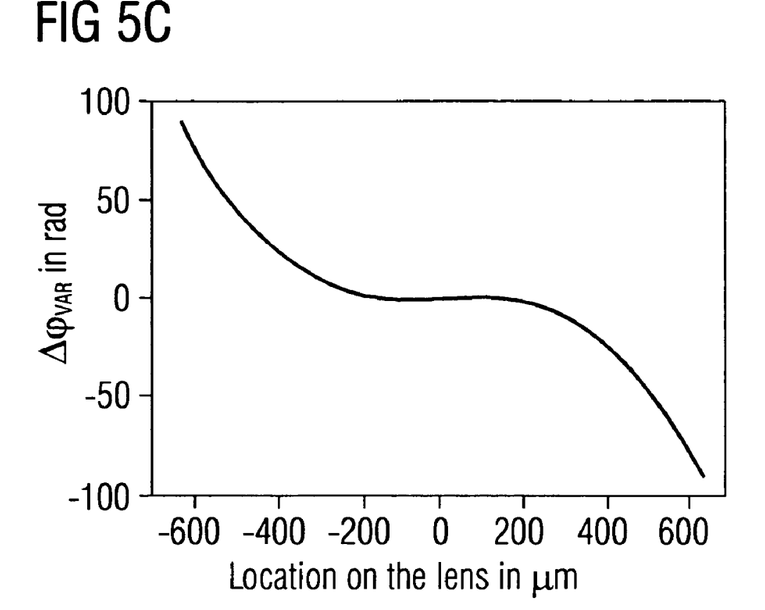
FIG. 5C shows the phase change, caused by the longitudinally displaceable phase plate of FIGS. 2A and 2B, as a function of location.
Figure 5D:
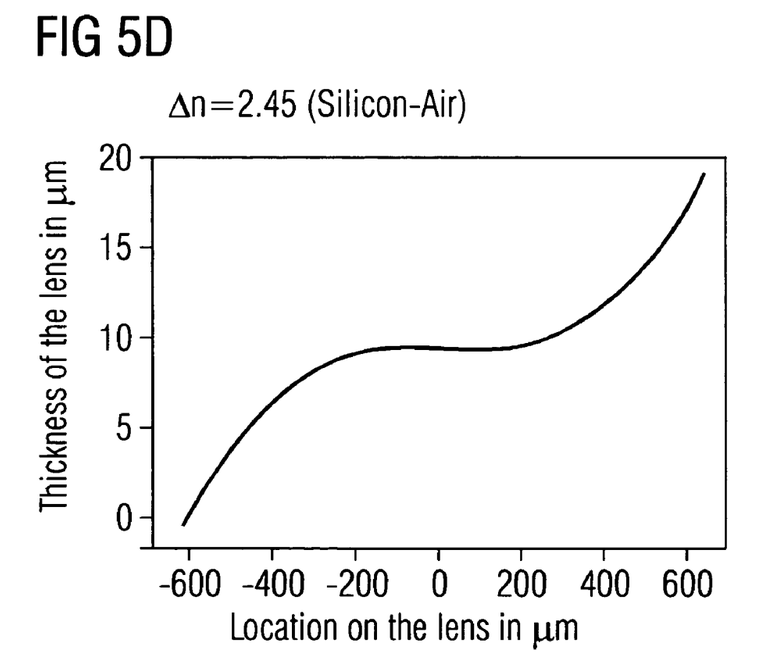
FIG. 5D shows the thickness of the longitudinally displaceable phase plate of FIGS. 2A and 2B, as a function of location.

FIGS. 5A, 5C show the required phase signatures of two phase plates 9, 8, and FIGS. 5B, 5D show the associated thicknesses of the phase plates 9, 8 plotted against location. The calculation can be performed using the formulas specified above. The thickness of the phase plates 9, 8 has been determined here for the case in which they consist of silicon ($n_{si}$≈3.45) and are surrounded by air ($n_{AIR}$=1), the result of this being a difference in refractive index of $\Delta n$=2.45. Here, the phase plates 8, 9 are preferably provided with an additional coating in order to reduce Fresnel losses.

In concrete terms, FIG. 5A shows the phase signature of the fixed phase plate 9, that is to say the dependence of the phase change $\Delta\phi$ when plotted against location x. The phase change $\Delta\phi$ is given in rad. The location "x" is given in µm. "x=0" in this case specifies the location at which the light with the central wavelength transilluminates the phase plate 9. FIG. 5b shows the corresponding thickness d of the phase plate 9 as a function of the location x.

The phase signature of the displaceable phase plate 8 plotted against location x is illustrated in a corresponding way in FIG. 5c. "x=0" specifies the location at which the light with the central wavelength transilluminates the phase plate 9 if the latter is located in the zero position. FIG. 5d shows the corresponding thickness of the phase plate 8 as a function of location.

Figure 6A:
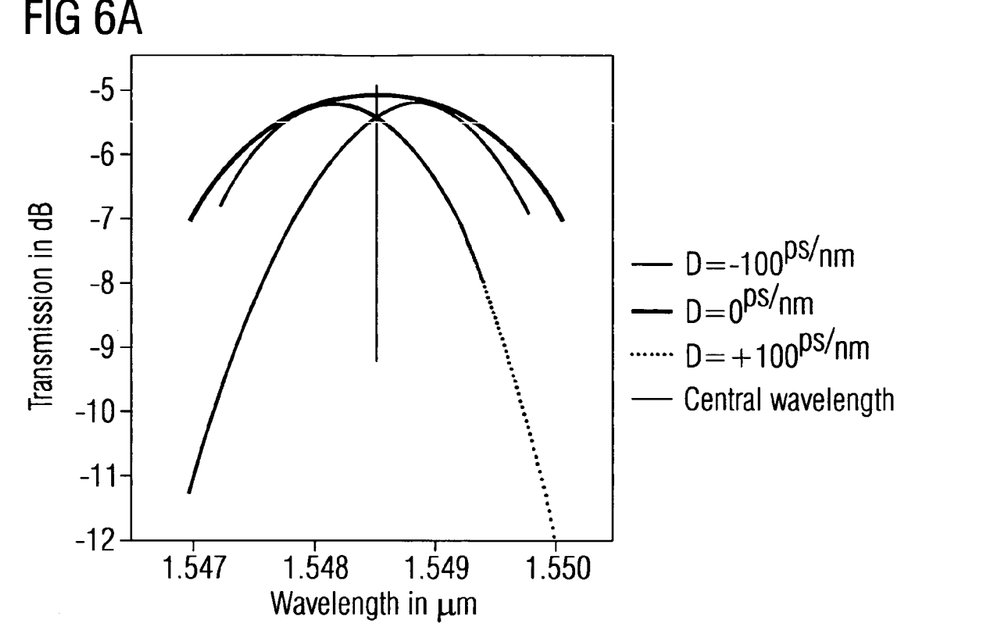
FIG. 6A shows the transmission of the apparatus of FIG. 1, as a function of wavelength.
Figure 6B:
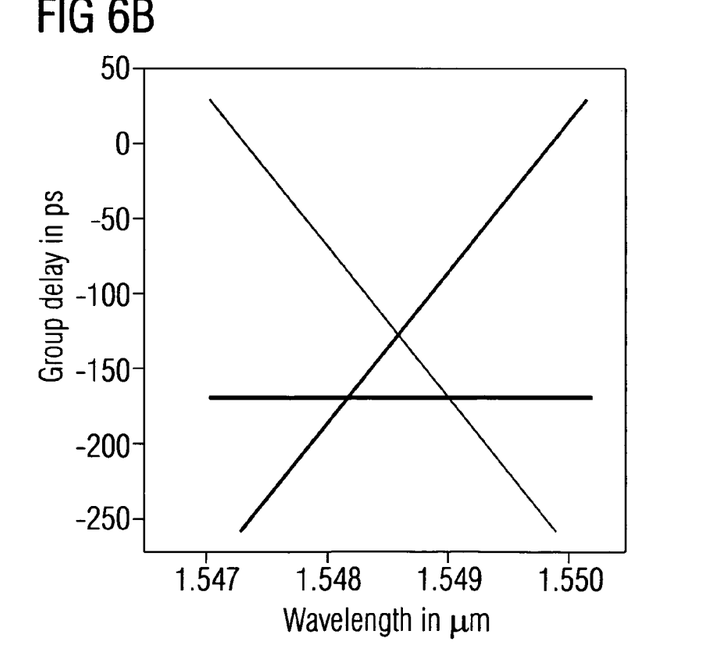
FIG. 6B shows the group delay as a function of wavelength.

FIGS. 6A and 6B show the transmission and the group delay of the described apparatus plotted against wavelength for a free spectral region and for the three cases of D=+100 ps/nm (dotted line), D=0 ps/nm (thick line) and D=–100 ps/nm (thin line). The characteristics of the group delay are approximately linear with the required dispersion values. The transmission characteristics have a passing character in the signal band.

Figure 3:
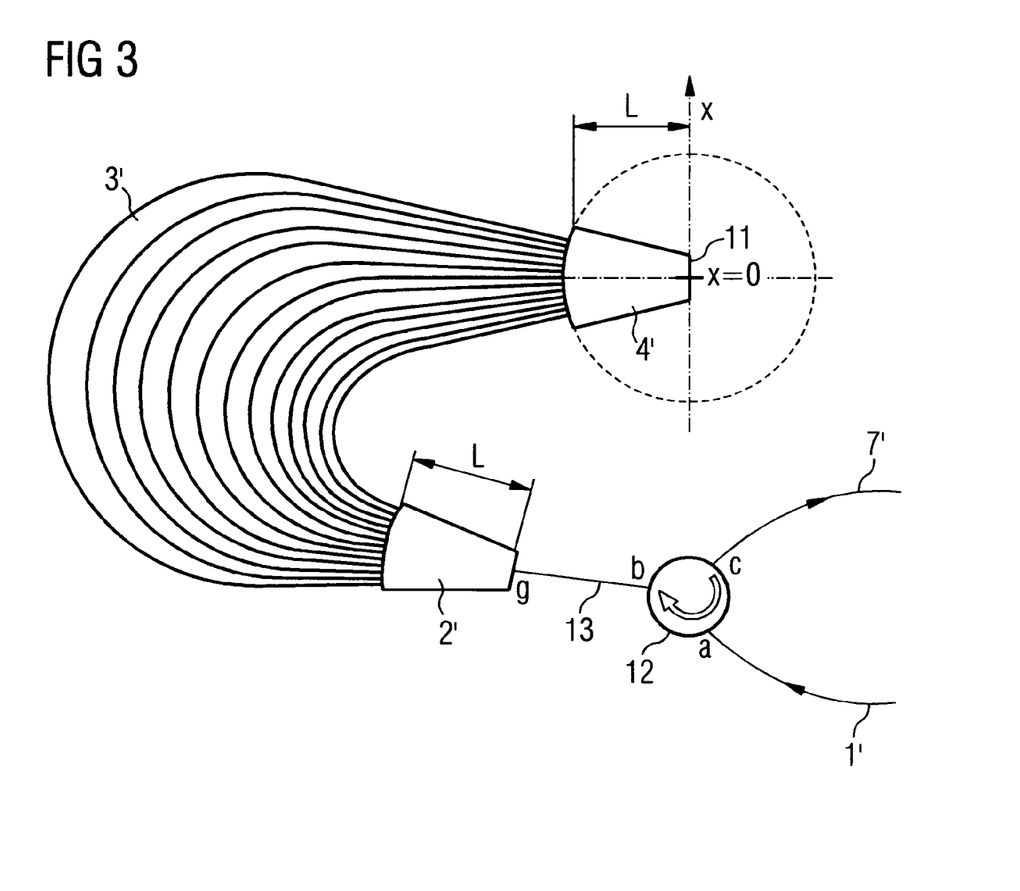
FIG. 3 shows a second exemplary embodiment of a planar optical apparatus for setting the chromatic dispersion, having only one phase grating and a mirror constructed in the second free-beam region.

An alternative exemplary embodiment of a planar optical apparatus for compensating the chromatic dispersion is illustrated in FIG. 3. The apparatus of FIG. 3 operates by reflection. An input waveguide 1' is connected in this case to the gate a of a 3-gate circulator 12 with three gates a, b, c. The light that is incident at this gate a emerges again at the gate b, and is fed from there via an optical waveguide 13 to an input point g of a first free-beam region 2'. After free-space propagation, the light is coupled into a phase grating 3' that is followed by a second free-beam region 4'.

As described previously with reference to FIG. 1, there is a spatial separation of the spectral components of the input signal. As will be described further below with the aid of FIGS. 4A, 4B, the phases of the spectral components are controlled in turn. In the exemplary embodiment of FIG. 3, however, the components being controlled in phase strike a reflecting surface 11 at the end of the second free-beam region 4' that is formed, for example, by a mirror. The light then recrosses the second free-beam region 4', is coupled again into the first phase grating 3' and traverses the first free-beam region 2', the light being combined again. The dispersion-compensating signal then emerges from the component at the point g and is guided to the gate b of the 3-gate circulator 12. The circulator 12 directs the light further to the gate c, from where it is coupled out into an output waveguide 7'.

Figure 4A:
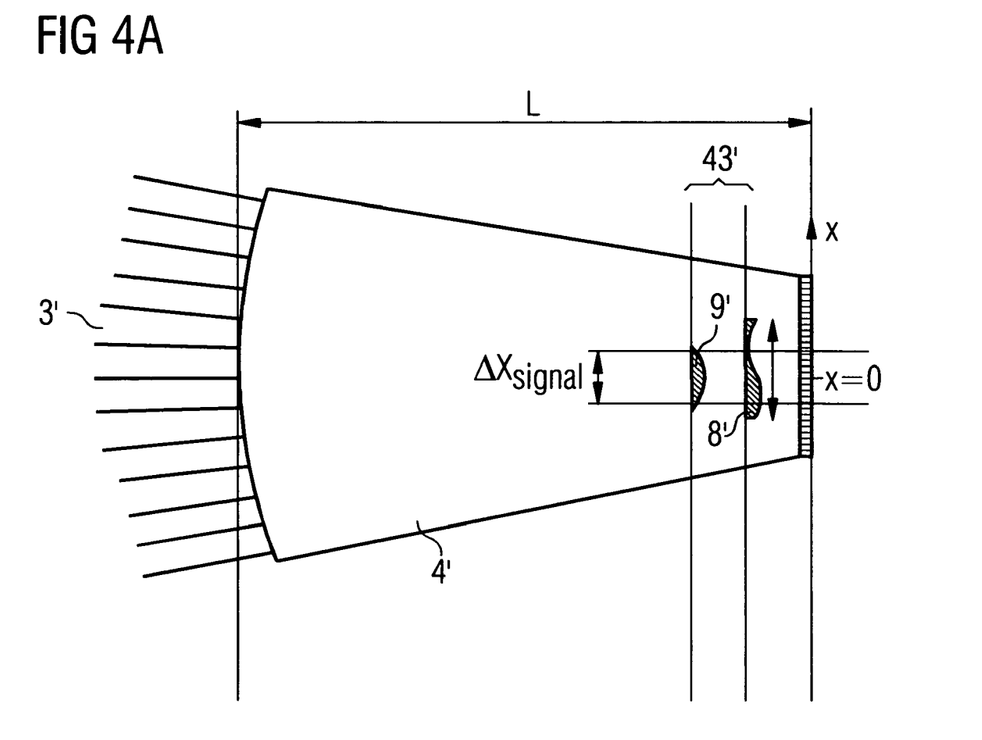
FIG. 4A shows an illustration of a detail of the second free-beam region of FIG. 3, in plan view.
Figure 4B:
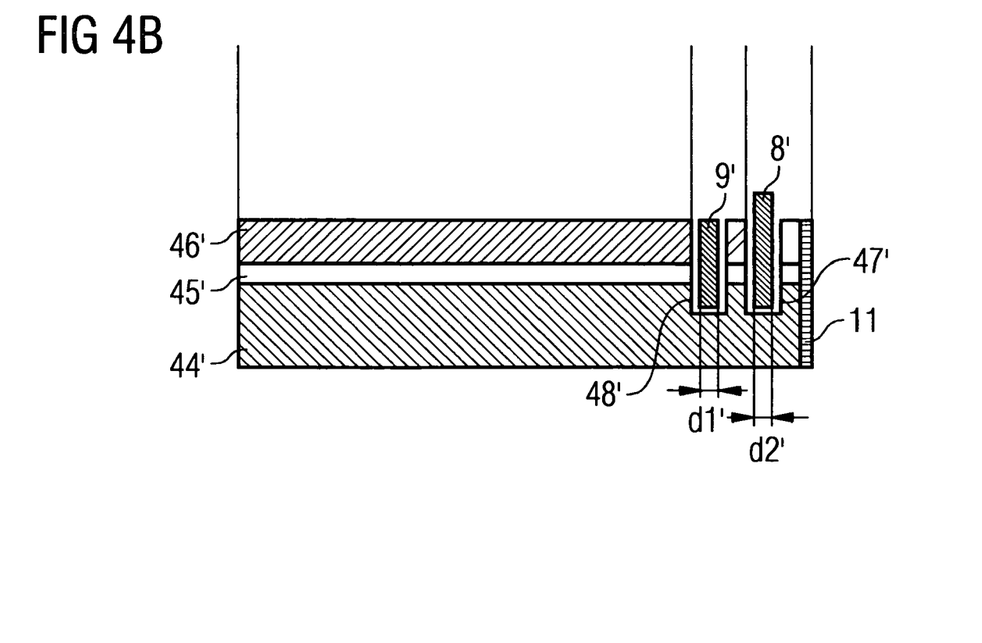
FIG. 4B shows the free-beam region of FIG. 4A, in a side view.

The components of the free-beam region 4' of the alternative embodiment of FIG. 3 are illustrated in FIGS. 4A, 4B. Provided, in turn, are a longitudinally displaceable phase plate 8' and a fixed phase plate 9' that are located in grooves 47', 48' of a planar carrier substrate comprising layers 44', 45', 46'. To this extent, reference may be made to the description of FIGS. 2A, 2B.

The phase plates 8', 9' are located in the region 43' at a distance L from the output of the phase grating 3', since constructive interference is present there. The reflecting mirror 11 is located as near as possible to the phase plates 8', 9', so that the image is blurred as little as possible on the path to the mirror 11. After reflection at the reflecting end face 11, the light is led once more through the phase plates 8', 9', and its phase is consequently changed and/or controlled again. Consequently, the phase plates 8', 9' are not identical in this refinement with the phase plates 8, 9 of FIGS. 2A, 2B, which are operated solely by transmission. Rather, the phase signatures of the phase plates 8', 9' in the case of the operation by reflection illustrated in FIG. 3 are only half as large as the phase signatures of the phase plates 8, 9 in the case of operation by transmission. The reason for this merely resides in the fact that the phase plates 8', 9' are traversed twice by the light and therefore need only to be half as thick. Again, the losses per pass will only be half as large. Since the phase plates are traversed twice, the total losses owing to the phase plates are identical for the components of FIGS. 1 and 3. However, Fresnel losses are neglected in this consideration.

In the case of parameter values corresponding to the exemplary embodiment of FIGS. 2A, 2B and 5, 6, the thicknesses of the phase plates 8, 9 being halved, the apparatus operated by reflection fits onto a 4-inch wafer.

The configuration of the invention is not limited to the exemplary embodiment illustrated above, which is to be understood merely as an example. The person skilled in the art will recognize that numerous alternative variant designs exist that utilize the teaching defined in the following claims despite their deviation from the described exemplary embodiment. For example, it can be provided that only one longitudinally displaceable phase plate 8, 8' is used for the dispersion compensation.

We claim:

1. A planar optical apparatus for setting the chromatic dispersion in an optical system, comprising:
   a waveguide input structure with a first free-beam region for transmitting a signal,
   a first phase grating, connected to the first free-beam region, for spatially separating the spectral components of the signal,
   a second free-beam region, connected to the first phase grating, for receiving the spatially separated spectral components of the signal,
   means for performing spatially dependent modification of a phase of the spatially separated spectral components of the signal in the second free-beam region,
   a second phase grating, connected to the second free-beam region, for combining the phase-modified spectral components of the signal, and
   a waveguide output structure with a third free-beam region attached to the second phase grating for transmitting the phase-modified signal,
   wherein the means for spatially dependent modification of the phase of the spatially separated spectral components includes a first phase plate that is moveably disposed in the second free-beam region.

2. The apparatus as claimed in claim 1, wherein the first phase plate is longitudinally displaceable perpendicular to a propagation direction of the signal in the second free-beam region.

3. The apparatus as claimed in claim 1, wherein the first phase plate is moveably arranged in a groove in a planar substrate on which the second free-beam region is implemented.

4. The apparatus as claimed in claim 1, wherein the first phase plate effects a spatially dependent modification of the phase of the spatially separated spectral components of the signal, which modification has a cubic characteristic that is dependent upon a location at which the spatially separated spectral components strike the first phase plate.

5. The apparatus as claimed in claim 1, further comprising means for displacing the first phase plate in the second free-beam region.

6. The apparatus as claimed in claim 1, wherein the means for spatially dependent modification of the phase of the spatially separated spectral components comprise an additional phase modification device that is fixedly arranged in the second free-beam region.

7. The apparatus as claimed in claim 6, wherein the additional phase modification device effects a spatially dependent shifting of a phase of the spatially separated spectral components of the signal in such a way as to compensate a wavelength dependency of the chromatic dispersion set by means of the first phase plate.

8. The apparatus as claimed in claim 6, wherein the additional phase modification device effects a spatially dependent shifting of the phase of the spatially separated spectral components of a signal in such a way as to compensate an intrinsic dispersion of the apparatus.

9. The apparatus as claimed in claim 6, wherein the additional phase modification device effects a spatially dependent modification of the phase of the spatially separated spectral components of the signal, which modification has a cubic characteristic dependent on a location at which the spatially separated spectral components strike the additional phase modification device.

10. The apparatus as claimed in claim 6, wherein the additional phase modification device comprises a second phase plate, which is arranged non-displaceably in the second free-beam region.

11. The apparatus as claimed in claim 10, wherein the second phase plate is arranged in a groove in a planar substrate on which the second free-beam region is implemented.

12. The apparatus as claimed in claim 10, wherein the second phase plate consists of silicon.

13. The apparatus as claimed in claim 12, wherein the second phase plate includes an antireflection coating.

14. The apparatus as claimed in claim 1, wherein the apparatus is of symmetrical design, and the first phase plate is located in a central zone of the second free-beam region between the first and the second phase gratings.

15. The apparatus as claimed in claim 14, wherein the means for spatially dependent modification of the phase of the spatially separated spectral components comprises an additional phase modification device that is fixedly arranged in the second free-beam region, and wherein the additional phase modification device is also arranged in the central zone of the second free-beam region between the first and the second phase gratings.

16. The apparatus as claimed in claim 1, wherein the waveguide input structure and the waveguide output structure are implemented by a single waveguide structure, the first free-beam region and the third free-beam region are implemented by a single free-beam region, and the first phase grating and the second phase grating are implemented by a single phase grating, and in which the second free-beam region has a reflection device at which the optical signal is reflected.

17. The apparatus as claimed in claim 16, wherein the reflection device is formed by a mirror constructed in the second free-beam region.

18. The apparatus as claimed in claim 16, wherein the waveguide input/output structure is connected to a three-gate circulator.

19. The apparatus as claimed in claim 1, wherein the planar optical apparatus comprises $SiO_2$ on Si.

20. The apparatus as claimed in claim 1, wherein the first phase plate consists of silicon.

21. The apparatus as claimed in claim 20, wherein the first phase plate includes an antireflection coating.

* * * * *